(12) United States Patent
Torres

(10) Patent No.: US 6,424,360 B1
(45) Date of Patent: Jul. 23, 2002

(54) DYNAMICALLY CONSTRUCTED INTEGRATION MENUS

(75) Inventor: Robert J. Torres, Colleyville, TX (US)

(73) Assignee: International Business Machines Corporation, Armonk, NY (US)

( * ) Notice: Subject to any disclaimer, the term of this patent is extended or adjusted under 35 U.S.C. 154(b) by 1156 days.

(21) Appl. No.: 08/531,812

(22) Filed: Sep. 21, 1995

(51) Int. Cl.$^7$ .................................................. G06F 3/00
(52) U.S. Cl. ........................................ 345/810; 345/841
(58) Field of Search ................................ 395/352, 353, 395/354, 348, 346, 333, 335; 345/333, 334, 335, 347, 352, 353, 762, 765, 744, 808, 810, 841

(56) References Cited

U.S. PATENT DOCUMENTS

| | | | | |
|---|---|---|---|---|
| 5,220,675 A | * | 6/1993 | Padawer et al. ............ | 395/800 |
| 5,361,358 A | | 11/1994 | Cox et al. .................... | 395/700 |
| 5,367,686 A | | 11/1994 | Fisher et al. ................ | 395/700 |
| 5,497,484 A | * | 3/1996 | Potter et al. ................ | 395/600 |
| 5,500,936 A | * | 3/1996 | Allen et al. ................. | 395/348 |
| 5,530,796 A | * | 6/1996 | Wang ........................ | 395/352 |
| 5,588,105 A | * | 12/1996 | Foster et al. ................ | 395/326 |

OTHER PUBLICATIONS

Jim Seymour "Component Software Is Here Now" PC Magazine, pp. 99–100, Jun. 28, 1994.
HG Advani "Adjunct Table for Interdependent Parameters" IBM Technical Disclosure Bulletin, vol. 28, No. 4, pp. 1453, publ. Sep., 1985.
TJ Perry and MR Turner "Tool to Facilitate Testing of Software to Insure Compatibility" IBM Technical Disclosure Bulletin vol. 30, No. 11, pp. 162–165, publ. Apr., 1988.
C Curley "Customization of Application Software using External Data" IBM Technical Disclosure Bulletin, vol. 36, No. 12, pp. 19–20, publ. Dec., 1993.
JW Malcolm, SA Morgan and CA Swearingen "Enabling Multiple Help Files for Dynamic Menu Item Help Support" IBM Technical Disclosure Bulletin, vol. 37, No. 4A, pp. 17–18, publ. Apr., 1994.
U.S. application No. 07/352,801, filed May 15, 1989.
U.S. application No. 07/875,001, filed Apr. 24, 1992 as a continuation of AH.
U.S. application No. 07/862,703, filed Apr. 3, 1992.
U.S. application No. 08/356,830, filed Dec. 15, 1994 as a continuation of AJ.
U.S. application No. 08/474,396, filed Jun. 7, 1995.

* cited by examiner

Primary Examiner—Cao K. Nguyen
(74) Attorney, Agent, or Firm—Norman L. Gundel

(57) ABSTRACT

A method and system are provided for dynamic construction of integration menus. In one embodiment, the invention stores, in a key programs list, both an executable filename and an associated menuitem for each of a plurality of first application programs; installs a menuitem for each of a plurality of such first application programs of the key programs list into a menu of a second application program; and executes one of the first application programs in response to the selection within the second application program of the menuitem associated with that first application program.

18 Claims, 8 Drawing Sheets

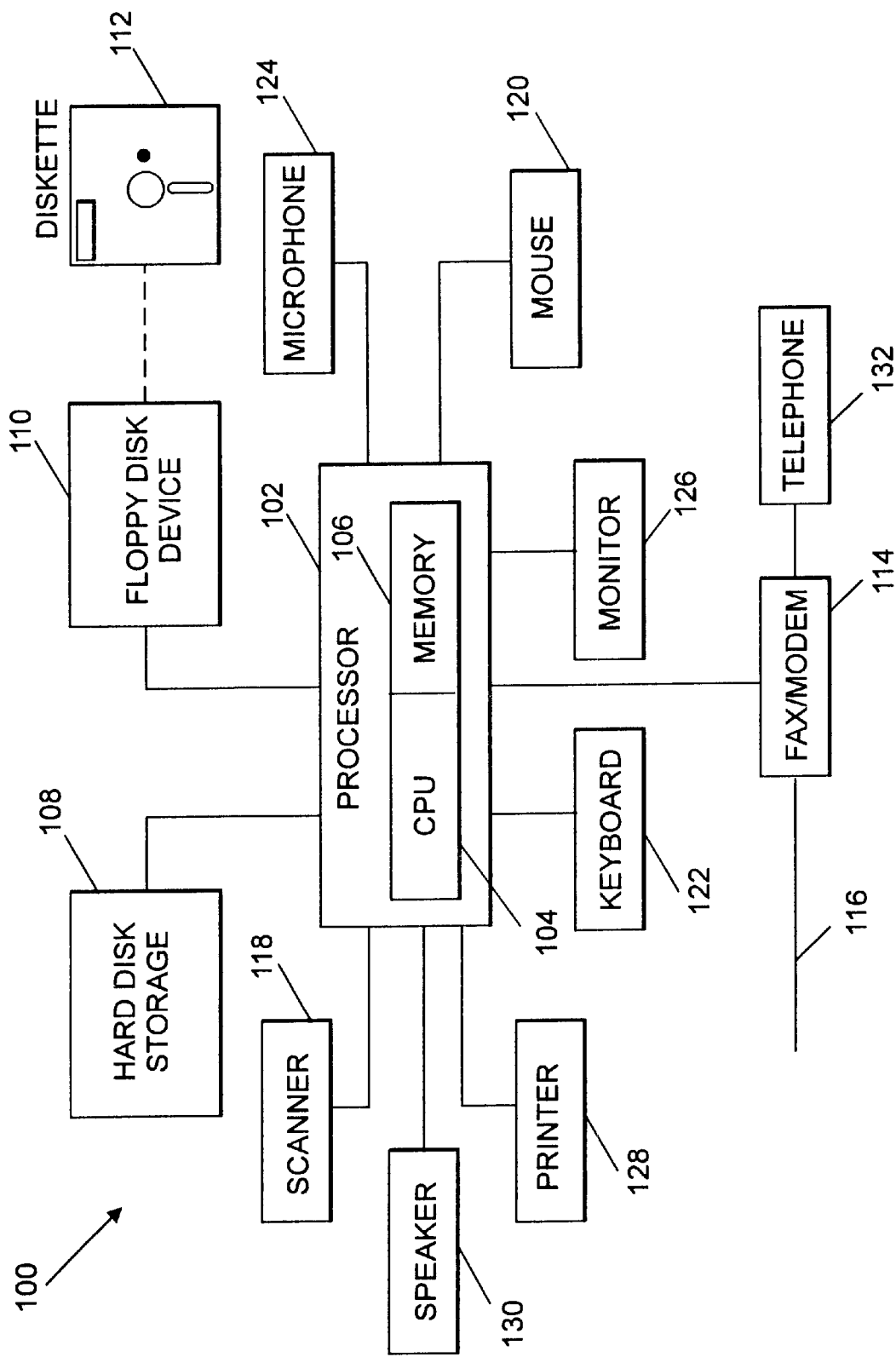

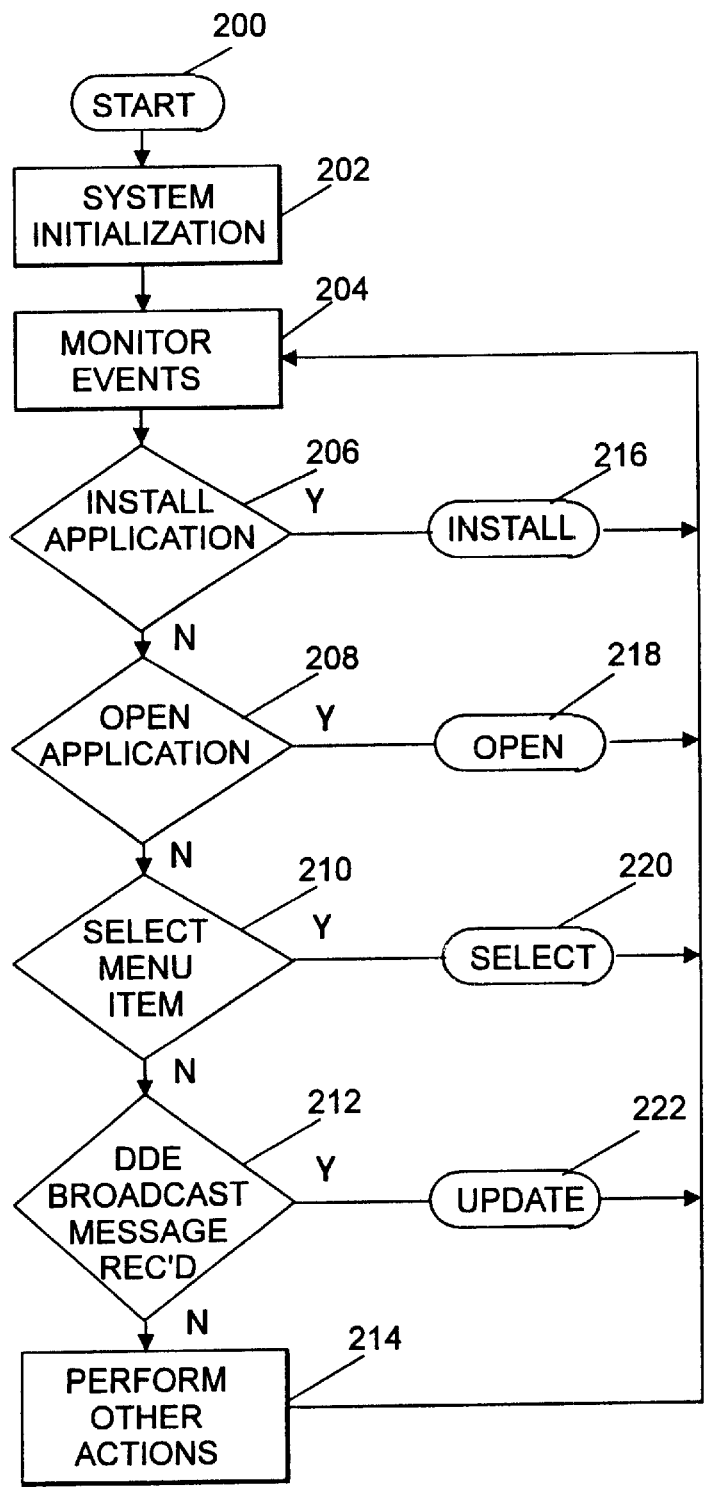

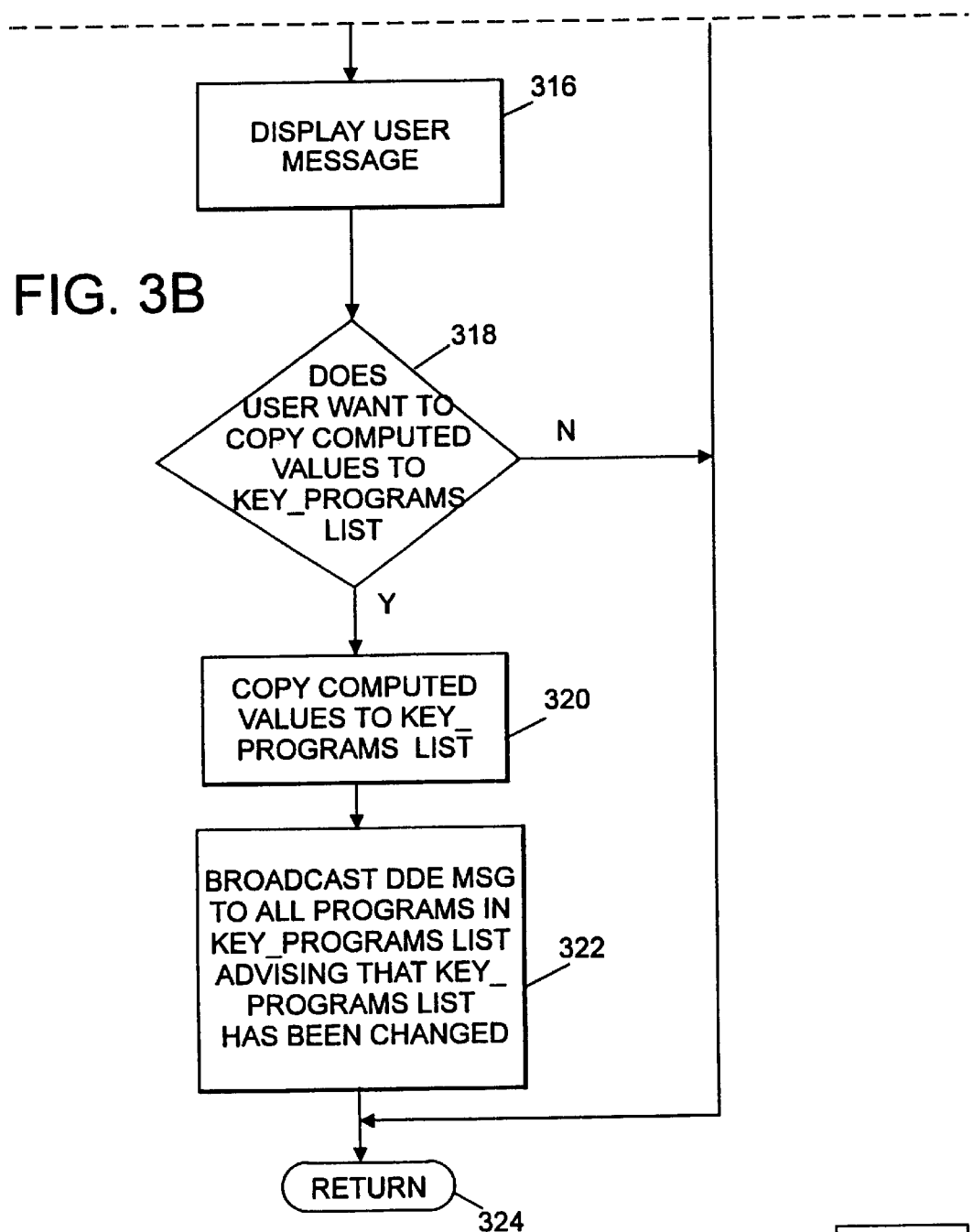

FIG. 7

KEY_PROGRAMS LIST 700

| PROGRAM NAME (.EXE, .DLL, ETC.) 702 | ICON NAME/PATH 704 | MENU; NAME; POSITION 706 | DATA TO PASS 708 |
|---|---|---|---|
| TJUMP.EXE | NA | FILE;JUMP;LAST | NA |
| ZMAL.EXE | C:\ZMAL\Z.BMP | TB; - HELP | SELECTION |
| | | | |
| | | | |

722 — TJUMP.EXE
724 — ZMAL.EXE

DYNAMICALLY CONSTRUCTED INTEGRATION MENUS

BACKGROUND OF THE INVENTION

1. Field of the Invention

The present invention relates to textual and graphical computer program integration menus, which are menus for accessing other application programs from within an application program. More particularly, the present invention relates to a method and apparatus for dynamically constructing textual and graphical integration menus and toolbars based upon installed application programs.

2. Description of the Related Art

Computers run computer application programs. Originally, a personal computer ran only one application program at a time. However, computer operating systems have been enhanced over the years to permit a single computer to run more than one application program concurrently. Operating systems have been enhanced to allow the operation of terminate-and-stay-resident application programs, task switching, and cooperative multitasking and now, in state of the art operating systems such as IBM OS/2 Warp Version 3 (trademarks of IBM Corp.) and the symmetric multiprocessor (SMP) version of IBM OS/2 version 2.11, multithreaded operation of individual application programs and preemptive multitasking of multiple application programs.

Such state of the art personal computer operating systems allow multiple application programs to be active simultaneously on a single computer such as an IBM PC computer (trademark of IBM Corp.). In a single processor computer or with a single processor enabled computer operating system, such as IBM OS/2 Warp Version 3, the computer executes one application program at a time by executing slices of each active application, and of each active thread of each active multithreaded application, in turn. To a person, called a user, who is operating the computer, however, this preemptive multitasking and multithreaded operation may be perceived as simultaneous execution of multiple active application programs.

Along with the ability to simultaneously execute multiple application programs has come the ability to initiate, or open, a second, presently inactive application program from within a first, presently active application program. Software architectures, such as Object Linking and Embedding (OLE) and OpenDoc have been and are being developed to take advantage of this ability. However, for an application program, or a user of an application program, to take advantage of this ability to open a second application program from within a first application program, the first application program must know of the installation and availability of the second application program and must provide the user with suitable menu choices, called integration menus, for accessing the second application program. Such menu choices within the first application program may be textual, as in a pull down menu, or graphical, as an icon on a toolbar.

Multiple application programs may be sold in a single bundle, or application suite, such as IBM Works, which is included with IBM OS/2 Warp Version 3; Lotus SmartSuite and Lotus Works (trademarks of Lotus Development Corp.); and Microsoft Office and Microsoft Works (trademarks of Microsoft Corp.) and other application suites. Such application suites may be preinstalled on a newly purchased computer; in such case, the seller of the computer may provide appropriate menus when preloading the software. Application suites that are not preinstalled may be provided with an installation utility that allows a user to select all, or some, of the application programs for simultaneous installation; as a part of the installation process, the installation utility may install menus for all of the application programs of the suite which are being installed by the installation utility.

A problem may arise, however, when other application programs, or application programs from a different vendor, are installed on the same computer. These application programs may also conform to the same, or to a compatible, software architecture and therefore be able to take advantage of the computer's ability to simultaneously execute multiple application programs. However, without integration menus to allow the user to open other application programs from within an already active application program, a significant advantage of the computer's ability to simultaneously execute multiple application programs may not be fully exploited.

A method and apparatus for dynamically constructing textual and graphical integration menus and toolbars in computer applications is needed.

SUMMARY OF THE INVENTION

In accordance with the invention a method and apparatus are provided for the dynamic construction of integration menus. In one embodiment, the invention stores, in a key programs list, both an executable filename and an associated menuitem for each of a plurality of first application programs; installs a menuitem for each of a plurality of such first application programs of the key programs list into a menu of a second application program; and executes one of the first application programs in response to the selection within the second application program of the menuitem associated with that first application program.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

FIG. 1 is a block diagram of an apparatus used in performing the method of a preferred embodiment of the present invention and forming a part of the apparatus of a preferred embodiment of the present invention;

FIG. 2 is a high level logic flowchart illustrating the method of dynamically constructing integration menus;

FIGS. 3A and 3B are a high level logic flowchart illustrating the "install" subroutine of the method of dynamically constructing integration menus of FIG. 2;

FIG. 7 illustrates the data structure of the KEY_PROGRAMS list maintained by the method of dynamically constructing integration menus of FIGS. 2–6.

Figure 3A:
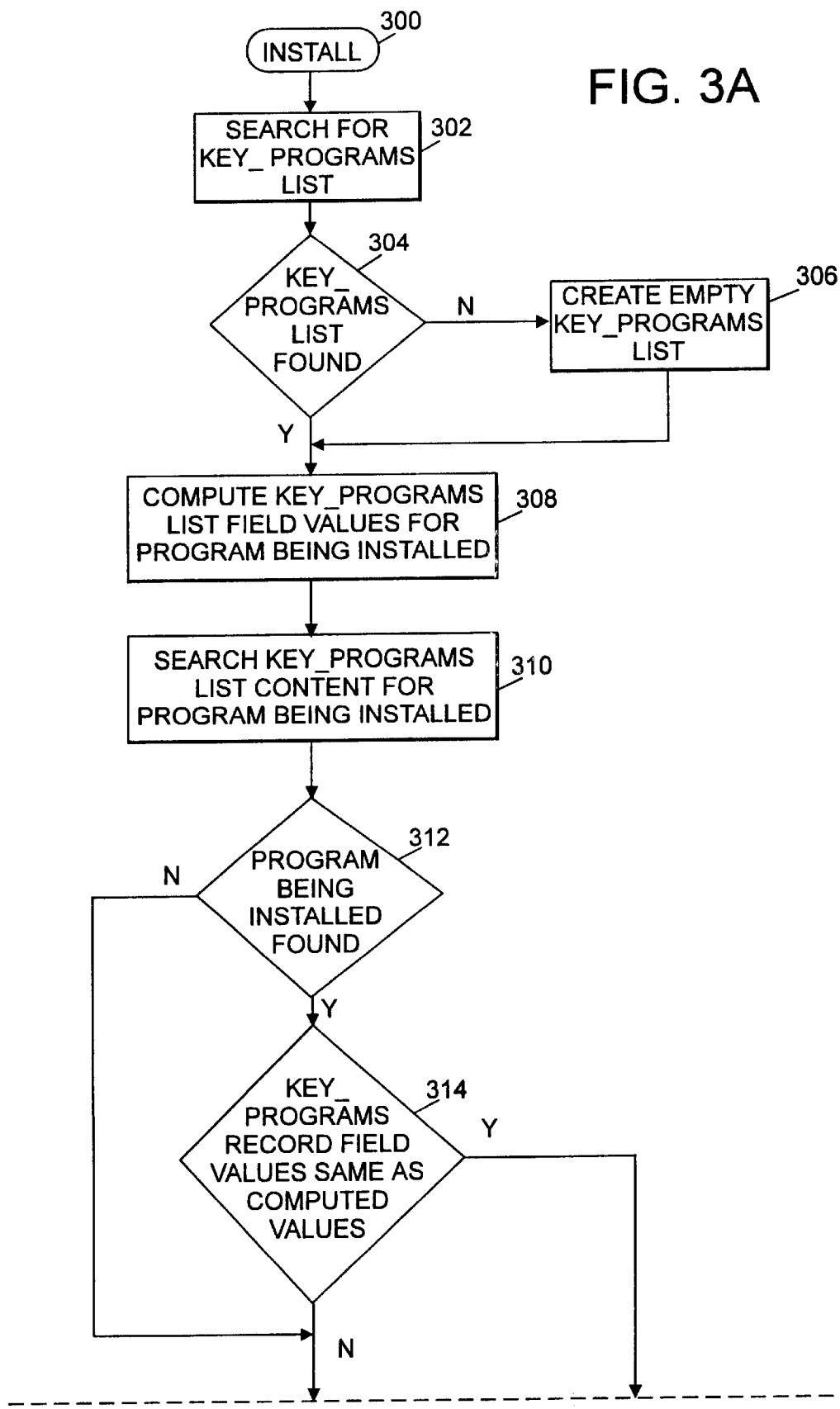

While the invention will be described in connection with a preferred embodiment, it will be understood that the description is not intended to limit the invention to that embodiment. On the contrary, the invention is intended to cover all alternatives, modifications and equivalents as may be included within the spirit and scope of the invention as described by the appended claims.

DETAILED DESCRIPTION OF THE PREFERRED EMBODIMENT

With reference now to the Figures, and in particular with reference to FIG. 1, there is shown, in block diagram form, an apparatus according to the present invention. The apparatus includes a data processing system 100, which may preferably be a single processor IBM PC computer running the IBM OS/2 Warp Version 3 operating system. The data processing system 100 includes a processor 102, which includes a central processing unit (CPU) 104 and memory 106. Additional memory, such as a hard disk file storage 108 and a removable media device 110 may be connected to the processor 102. Removable media device 110 may read from and, usually, write to removable media 112. Removable media 112 may be magnetic or optical, such as a floppy diskette or a compact disk—read only memory which may have computer program code recorded thereon that implements portions of the present invention in the data processing system 100. Inputs may also be received from a fax/modem 114, which may be connected to a telephone line 116, and from a microphone 124. The data processing system 100 may also includes user interface hardware, such as a mouse 120, a keyboard 122 and a scanner 118, for allowing user input to the data processing system 100. The data processing system 100 may also includes visual display devices, such as a monochrome or color display monitor 126 and a monochrome or color display printer 128, for rendering visual information. The data processing system may also include an audio display device, such as a speaker 130 for rendering audio information. A telephone 132 may also be connected to the telephone line 116 as through the fax/modem 114.

The data processing system 100 may be used to run application programs that permit user interaction through menus. As used herein, the term menu encompasses all means by which the data processing system presents choices among which the user may select, thereby providing input to the data processing system 100. Such menus may be visual or aural, and may but need not necessarily be displayed or otherwise presented to the user prior to the user selecting from the choices. Menus may be presented visually, such as the common pulldown menus that may be accessed from a menu bar of an application program. Such menus typically present multiple choices to the user, and the user may commonly select among the choices by the use of a function key, the use of a "hot key" such as a letter key or number key, with or without the preceding or simultaneous use of an augmentation key such as "Shift," "Alt," Ctrl" or "Home." The user may also use a pointing device such as a mouse to select from a menu. The user may also place the application program's input focus on the choice, using a navigation key or a pointing device, and then press "Enter." Similarly, an icon in a toolbar may be displayed and selected by the user. In a voice input enabled data processing system 100, a user may also make a selection by speaking a word or phrase that the data processing system recognizes as associated with a selection. Although the preferred embodiment described herein contemplates selection of a visual menuitem from a displayed visual menu, the invention contemplates the selection of menuitems, which need not be displayed or voiced by the data processing system 100, using voice or other sound inputs. Other means of selection of menuitems are also contemplated as they may be developed or popularized in the data processing art.

With reference now to FIG. 2, there is depicted a high level logic flowchart which illustrates the method of a preferred embodiment of the present invention for dynamically creating integration menus. The method begins at block 200 and initializes at block 202. The process then proceeds to block 204 and monitors ongoing events of the data processing system 100.

Decision blocks 206, 208, 210 and 212 detect events of interest to the process. Other events pass through decision blocks 206, 208, 210 and 212 to block 214 for performance of other actions as appropriate to such other events. The process then returns from block 214 to block 204 to continue monitoring ongoing events of the data processing system 100.

Returning to block 204, the process passes from block 204 to decision block 206 upon detection of an event to determine whether the event is the installation of a dynamic choice enabled application. If so, the process passes to block 216 and then to the "install" subroutine depicted in FIG. 3 and described below. If not, the process passes to decision block 208.

Decision block 208 determines whether the event is the opening of a previously installed dynamic choice enabled application. If so, the process passes to block 218 and then to the "open" subroutine depicted in FIG. 4 and described below. If not, the process passes to decision block 210.

Decision block 210 determines whether the event is the selection of a dynamic choice menuitem or icon of an open dynamic choice enabled application. If so, the process passes to block 220 and then to the "select" subroutine depicted in FIG. 5 and described below. If not, the process passes to decision block 212.

Decision block 212 determines whether the event is the receipt of a DDE message by an open dynamic choice enabled application. If so, the process passes to block 222 and then to the "update" subroutine depicted in FIG. 6 and described below. If not, the process passes to decision block 214 for performance of other action as appropriate to such event. The process then returns from block 214 to block 204 to continue monitoring ongoing events of the data processing system 100.

Turning next to FIG. 3, the "install" subroutine is illustrated beginning at block 300. At block 302, the subroutine searches the data processing system 100 for a KEY_PROGRAMS list maintained by the system 100. At block 304, the subroutine determines whether a KEY_PROGRAMS list was found. If not, the process creates an empty KEY_PROGRAMS list at block 306 and then proceeds to block 308. If a KEY_PROGRAMS list was found, the subroutine proceeds directly from block 304 to block 308.

The structure of the KEY_PROGRAMS list 700 of data processing system 100 is illustrated in FIG. 7. The list 700 may contain multiple records, or items, 722, 724, each of which is illustrated in FIG. 7 as a row. Each item 722, 724 preferably describes a single program and preferably contains various fields 702–708 which are illustrated in FIG. 7 as columns. Field 702 includes the name, which preferably includes a pathname, of an executable program. Field 704 may include an icon filename 704, which also preferably includes a pathname. Field 706 may specify a menu, the text to be inserted as a menuitem in the specified menu, and the position of the inserted menuitem in the menu. Selection, from within an application program, of either the icon described in field 704 or the menuitem described in field 706 will open the application program identified in field 702. Field 708 may contain a statement of any data to be passed to the program identified in field 702 upon selection of the icon identified in field 704 or selection of the menuitem identified in field 706.

Returning to the description of the "install" subroutine of FIG. 3, at block 308 the subroutine computes the KEY__PROGRAMS list field values for the application program being installed, using the program's installation defaults such as executable filenames, paths, icon choices, etc. as they may have been selected or modified during the installation process. The subroutine then proceeds to block 310 and compares the identity of the application program being installed to the contents of the KEY__PROGRAMS list and proceeds to decision block 312. If the application program being installed is not found in an item of the KEY__PROGRAMS list, the subroutine proceeds to block 316, discussed below. If the application program being installed is found in an item 722, 724 of the KEY__PROGRAMS list, the subroutine proceeds from decision block 312 to decision block 314. There, the subroutine compares the default values determined in block 308 to the contents of the item found in the KEY__PROGRAMS list. If they are identical, the subroutine proceeds to block 324 and returns to block 204 of FIG. 2; otherwise it proceeds to block 316.

In block 316, the subroutine displays a message asking the user whether he wants to copy the KEY__PROGRAMS list values computed in block 308 to the KEY__PROGRAMS list. The subroutine then proceeds to block 318. If the response at block 318 is negative, the subroutine proceeds to block 324 and returns to block 204 of FIG. 2. If the response at block 318 is positive, the subroutine proceeds to block 320 and copies the KEY__PROGRAMS list values computed in block 308 to the KEY__PROGRAMS list, overwriting any existing values for the application program. The subroutine then broadcasts a DDE message to all other programs listed in the KEY__PROGRAMS list. Receipt of this DDE message allows any of the dynamic choice enabled programs that may be active at the time of the broadcast to dynamically update their integration menus, as will be described below in connection with the "update" subroutine described in FIG. 6. The "install" subroutine then proceeds to block 324 and returns to block 204 of FIG. 2.

Figure 4:
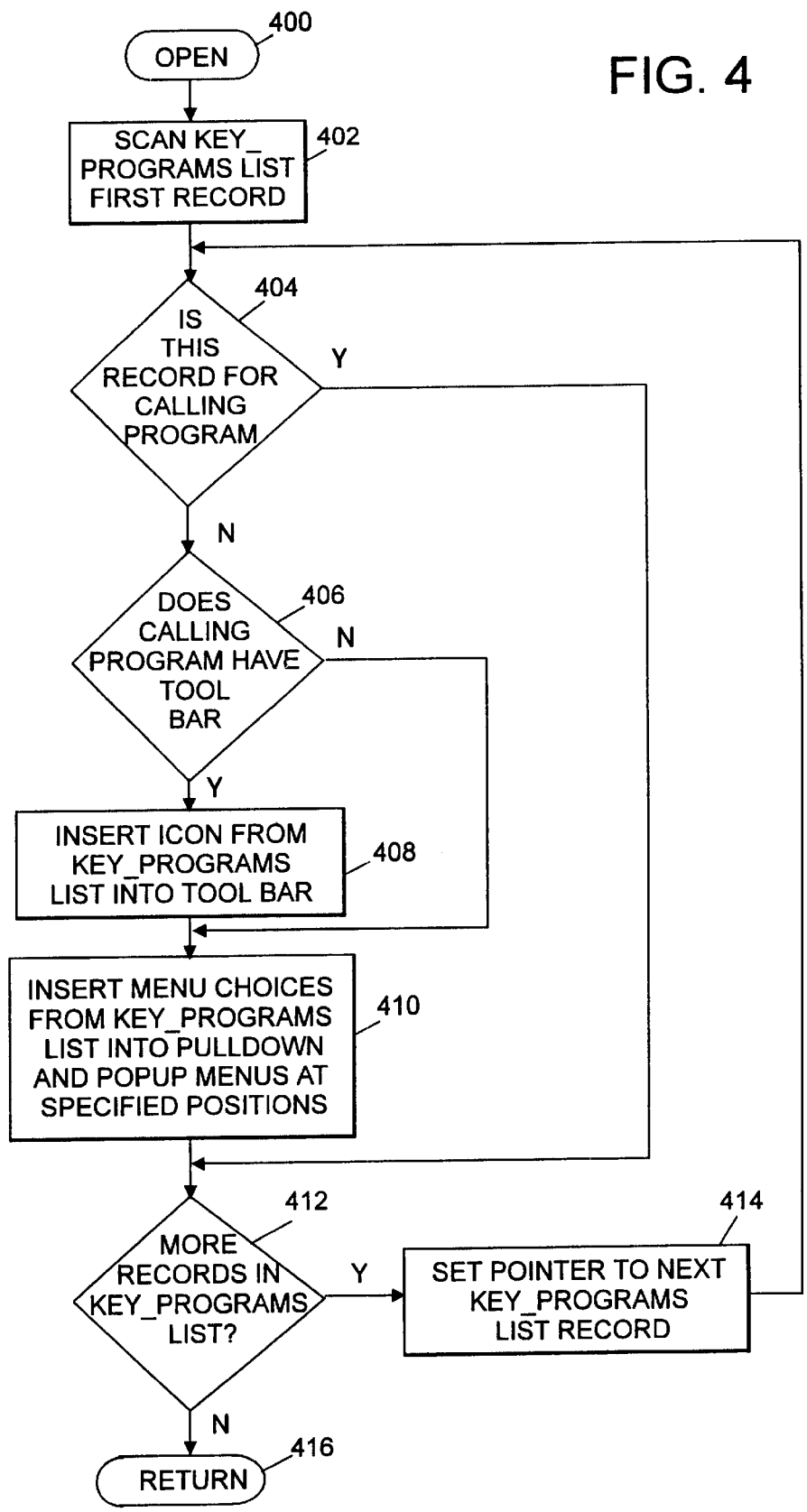
FIG. 4 is a high level logic flowchart illustrating the "open" subroutine of the method of dynamically constructing integration menus of FIG. 2.

Turning next to FIG. 4, the "open" subroutine is illustrated beginning at block 400. It proceeds to block 402 to scan the first record 722, 724 of the KEY__PROGRAMS list 700. The subroutine then proceeds to decision block 404 for a determination of whether the KEY__PROGRAMS list record describes the calling application, which is the application that called the "open" subroutine. If so, the subroutine passes to block 412 for a determination of whether there are additional records in the KEY__PROGRAMS list. If not, the process passes to block 416 and returns to block 204 of FIG. 2. If there are more records, the process passes to block 414, adjusts its pointer to the next KEY__PROGRAMS list record, and returns to decision block 404 described above.

If the KEY__PROGRAMS list record does not describe the calling application, the subroutine passes from block 404 to block 406 for a determination of whether the calling application has a toolbar. If so, the subroutine passes to block 408 and inserts the icon identified in icon name/path field 704 of the KEY__PROGRAMS list record into the calling application. The subroutine then proceeds to block 410 and inserts the menuitem specified in the KEY__PROGRAMS list record's "menu, name, position" field 706 into the calling application in the specified menu at the specified location. As shown in example record 722, this field 706 may take the form of "File;Jump;last", signifying that the menuitem "Jump" is to be inserted into the "File" menu as the last menuitem. Subsequent selection of this menuitem in the calling application will activate the program "Tjump.exe". The subroutine then proceeds to decision block 412 as described above.

Figure 5:
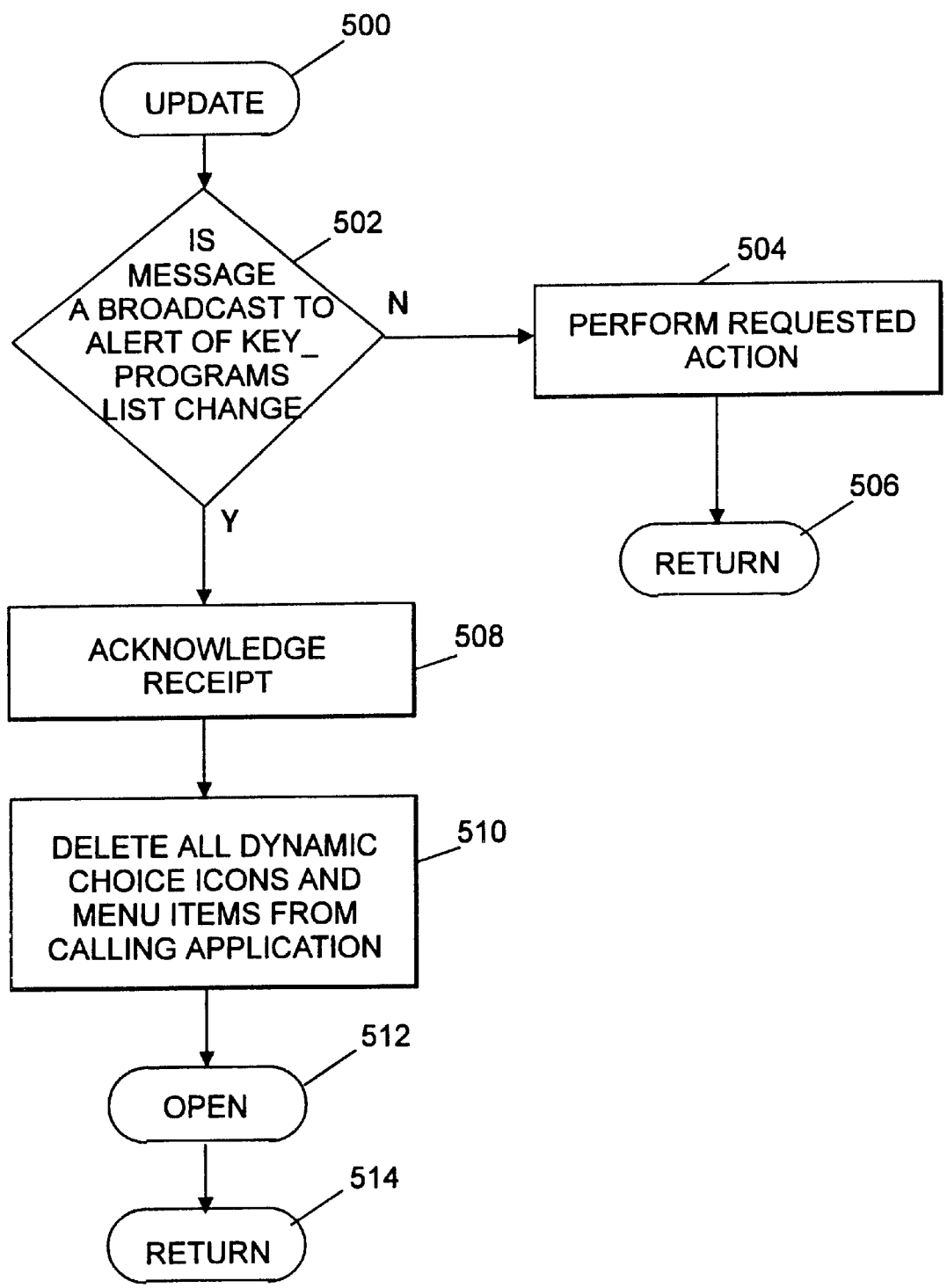
FIG. 5 is a high level logic flowchart illustrating the "update" subroutine of the method of dynamically constructing integration menus of FIG. 2.

Turning next to FIG. 5, the "update" subroutine is illustrated beginning at block 500. It proceeds to decision block 502 to test whether the DDE message is a broadcast to alert open dynamic choice applications of a change to the KEY__PROGRAMS list, such as the broadcast message sent by block 322 of the "install" subroutine of FIG. 3. If the DDE message is not such a broadcast, the subroutine passes to block 504, performs the requested action, passes to block 506 and returns to block 204 of FIG. 2. If the DDE message is such a broadcast, the subroutine passes from block 502 to block 508 and acknowledges receipt of the DDE message.

If multiple dynamic choice enabled applications are open when such a broadcast is sent, each open dynamic choice application will separately receive the DDE message, acknowledge receipt and process its received message separately. Each will thus proceed as described in blocks 500, 502, 504, 506 and 508 discussed above.

From block 508, each open dynamic choice application proceeds to block 510 and deletes all dynamic choice menuitems and icons from its menus and toolbars. Each open dynamic choice application then proceeds to block 512 and executes the "open" subroutine described above and illustrated in FIG. 3. The "open" subroutine will install the menuitems and icons currently described in the KEY__PROGRAMS list, thereby updating each open dynamic choice application upon receipt of a DDE broadcast message resulting from a change to the KEY__PROGRAMS list. Upon completion of the "update" subroutine, the process passes to block 514 and returns to block 204 of FIG. 2 to continue monitoring events.

Figure 6:
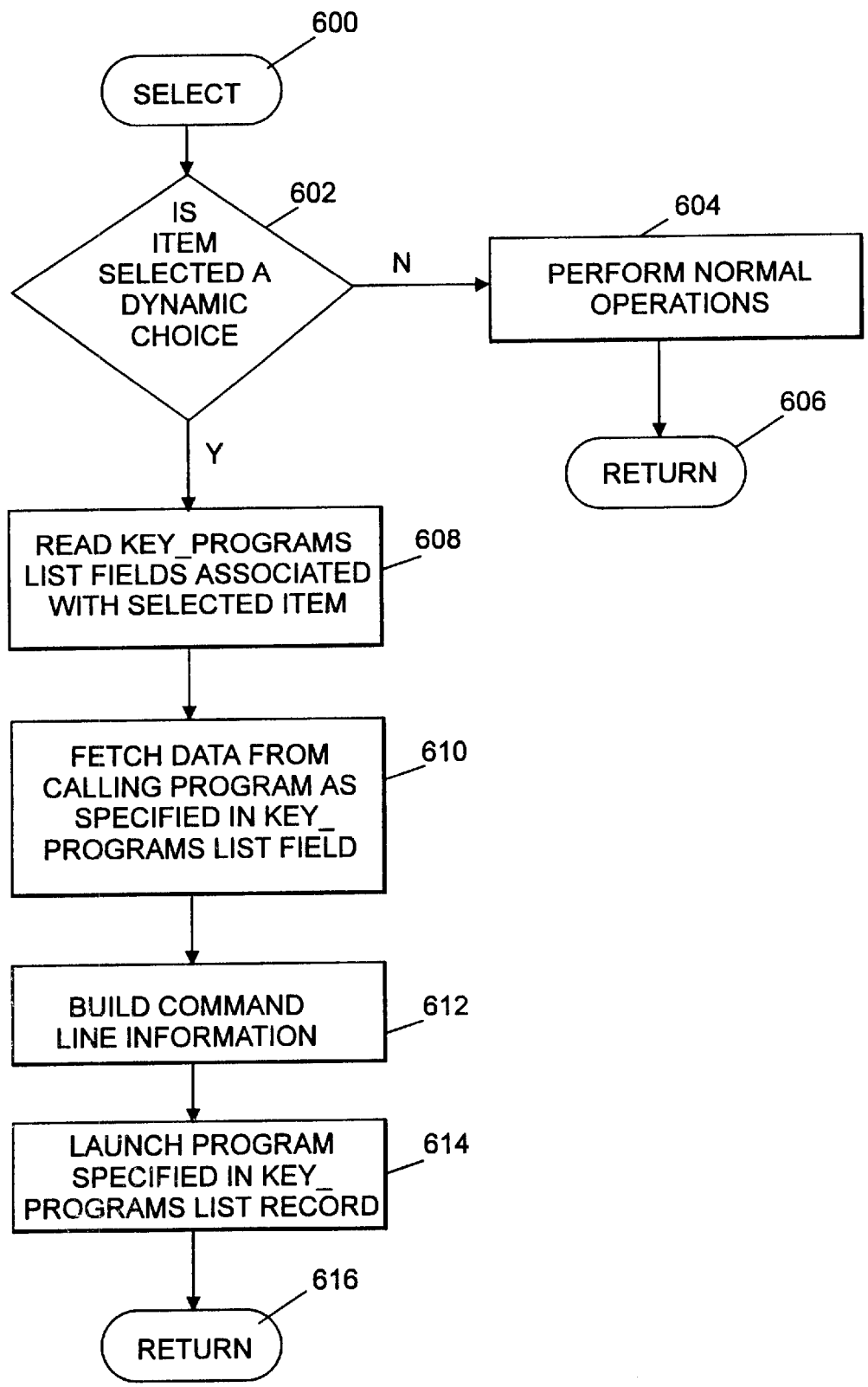
FIG. 6 is a high level logic flowchart illustrating the select" subroutine of the method of dynamically constructing integration menus of FIG. 2.

Turning next to FIG. 6, the "select" subroutine is illustrated beginning at block 600. It proceeds to decision block 602. If the item or menuitem selected is not a dynamic choice, the subroutine proceeds to block 604 and performs the normal operation called for by the "select" event. The process then passes to block 606 and returns to block 204 of FIG. 2.

If, in decision block 602, the item or menuitem selected is a dynamic choice as described herein, the subroutine passes to block 608 and reads the data pointers found in the KEY__PROGRAMS list record for the dynamic menu choice selected. The process then proceeds to block 610 and fetches the data needed for the dynamic call to be executed. The data to be fetched is that described in the statement of data to be passed found in block 708 of the appropriate KEY__PROGRAMS list record. The described data is fetched from the application from which the dynamic choice item or menuitem was selected. This data and the program name from block 702 of the KEY__PROGRAMS list record are then used in block 712 to create a command line statement. This command line statement is then used by the subroutine in block 714 to launch the program specified in the KEY__PROGRAMS list record, passing the specified data as a command line parameter. The subroutine then passes to block 616 and returns to block 204 of FIG. 2.

While the invention has been particularly shown and described with reference to a preferred embodiment and process, it will be understood that various changes in form and detail may be made therein without departing from the spirit and scope of the invention.

What is claimed is:

1. A method, performed in a data processing system, for creating dynamically constructed integration menus, the method comprising the computer implemented steps of:

storing, in a key programs list, both an executable filename and an associated menu item for each of a plurality of first application programs;

installing a menu item for each of a plurality of such first application programs of the key programs list into a menu of a second application program in response to the opening of the second application program; and executing one of the first application programs in response to the selection within the second application program of the menu item associated with that first application program, which menu item was installed into a menu of a second application program in response to the opening of the second application program.

2. The method of claim 1, wherein the selected menu item is installed into a pulldown menu of the second application program.

3. The method of claim 1, wherein the selected menu item is an icon installed into a toolbar of the second application program.

4. The method of claim 1, wherein both a toolbar icon and a pulldown menu item are associated with and stored in the key programs list with an executable filename of a first application program;

wherein both the associated toolbar icon and pulldown menu item stored in the key programs list in association with such first application program are installed into a toolbar and into a pulldown menu, respectively, of a second application program in response to the opening of the second application program; and wherein the menu item selected is one of the associated toolbar icon or the pulldown menu item.

5. The method of claim 1, wherein a statement of data to be passed to a first application program is stored in the key programs list in association with the executable filename of the first application program; and wherein data of the second application program as described in the associated statement of data to be passed is input to the first application program in response to selection in the second application program of the menu item associated with the first application program.

6. The method of claim 1, further comprising the computer implemented steps of:

in response to the receipt of a message by the second application informing the second application that the content of the key programs list has changed, deleting from the second application the menu items for the plurality of the first application programs of the key programs list that were installed into a menu of a second application program in response to the opening of the second application program; and installing a menu item for each of a plurality of such first application programs of the changed key programs list into a menu of a second application program.

7. A data processing system for creating dynamically constructed integration menus, comprising:

means for storing, in a key programs list, both an executable filename and an associated menu item for each of a plurality of first application programs;

means for installing a menu item for each of a plurality of such first application programs of the key programs list into a menu of a second application program in response to the opening of the second application program; and means for executing one of the first application programs in response to the selection within the second application program of the menu item associated with that first application program, which menu item was installed into a menu of a second application program in response to the opening of the second application program.

8. The data processing system of claim 7, wherein the selected menu item is installed into a pulldown menu of the second application program.

9. The data processing system of claim 7, wherein the selected menu item is an icon installed into a toolbar of the second application program.

10. The data processing system of claim 7, wherein both a toolbar icon and a pulldown menu item are associated with and stored in the key programs list with an executable filename of a first application program;

wherein both the associated toolbar icon and pulldown menu item stored in the key programs list in association with such first application program are installed into a toolbar and into a pulldown menu, respectively, of a second application program in response to the opening of the second application program; and wherein the menu item selected is one of the associated toolbar icon or the pulldown menu item.

11. The data processing system of claim 7, wherein a statement of data to be passed to a first application program is stored in the key programs list in association with the executable filename of the first application program; and wherein data of the second application program as described in the associated statement of data to be passed is input to the first application program in response to selection in the second application program of the menu item associated with the first application program.

12. The data processing system of claim 7, further comprising:

means for deleting, from the second application, the menu items for the plurality of the first application programs of the key programs list that were installed into a menu of a second application program in response to the opening of the second application program, in response to the receipt of a message by the second application informing the second application that the content of the key programs list has changed; and means for installing a menu item for each of a plurality of such first application programs of the changed key programs list into a menu of a second application program.

13. A computer program product, for use in a data processing system, the computer program product comprising:

a computer usable medium having computer readable program code-embodied in said medium for creating dynamically constructed integration menus, said computer program product including:

computer readable program code means for causing said data processing system to store, in a key programs list, both an executable filename and an associated menu item for each of a plurality of first application programs;

computer readable program code means for causing said data processing system to install a menu item for each of a plurality of such first application programs of the key programs list into a menu of a second application program in response to the opening of the second application program; and computer readable program code means for causing said data processing system to execute one of the first application programs in response to the selection within the second application program of the menu item associated with that first application program, which menu item was installed into a menu of a second application program in response to the opening of the second application program.

14. The computer program product of claim 13, wherein the selected menu item is installed into a pulldown menu of the second application program.

15. The computer program product of claim 13, wherein the selected menu item is an icon installed into a toolbar of the second application program.

16. The computer program product of claim 13, wherein both a toolbar icon and a pulldown menu item are associated with and stored in the key programs list with an executable filename of a first application program;

wherein both the associated toolbar icon and pulldown menu item stored in the key programs list in association with such first application program are installed into a toolbar and into a pulldown menu, respectively, of a second application program in response to the opening of the second application program; and wherein the menu item selected is one of the associated toolbar icon or the pulldown menu item.

17. The computer program product of claim 13, wherein a statement of data to be passed to a first application program is stored in the key programs list in association with the executable filename of the first application program; and wherein data of the second application program as described in the associated statement of data to be passed is input to the first application program in response to selection in the second application program of the menu item associated with the first application program.

18. The computer program product of claim 13, further comprising:

computer readable program code means for causing said data processing system to delete, from the second application, the menu items for the plurality of the first application programs of the key programs list that were installed into a menu of a second application program in response to the opening of the second application program, in response to the receipt of a message by the second application informing the second application that the content of the key programs list has changed; and computer readable program code means for causing said data processing system to install a menu item for each of a plurality of such first application programs of the changed key programs list into a menu of a second application program.

* * * * *